(12) United States Patent
Song

(10) Patent No.: US 8,687,295 B2
(45) Date of Patent: Apr. 1, 2014

(54) APPARATUS FOR ADJUSTING OPTICAL ELEMENT

(75) Inventor: Myung-yong Song, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 231 days.

(21) Appl. No.: 13/157,496

(22) Filed: Jun. 10, 2011

(65) Prior Publication Data

US 2012/0063017 A1    Mar. 15, 2012

(30) Foreign Application Priority Data

Sep. 13, 2010  (KR) ..................... 10-2010-0089462

(51) Int. Cl.
*G02B 7/02* (2006.01)
(52) U.S. Cl.
USPC ........................................................ 359/822
(58) Field of Classification Search
USPC ................................ 359/822–824
See application file for complete search history.

(56) References Cited

U.S. PATENT DOCUMENTS

| 4,601,539 A * | 7/1986 | Watanabe ................. 359/824 |
| 2011/0013296 A1* | 1/2011 | Kazahaya ................. 359/819 |

FOREIGN PATENT DOCUMENTS

KR    2001-0084214 A    9/2001

* cited by examiner

*Primary Examiner* — James Jones
(74) *Attorney, Agent, or Firm* — Drinker Biddle & Reath LLP

(57) ABSTRACT

An apparatus for adjusting an optical element includes at least one optical element for passing light, an adjustment frame coupled to an edge of the optical element, a lens barrel supporting a rear side of the adjustment frame, an elastic support unit arranged between the adjustment frame and the lens barrel and providing an elastic force to the adjustment frame, and at least one axial adjustment unit coupled to the lens barrel by penetrating the adjustment frame and the elastic support unit and adjusting a position of the adjustment frame in an axial direction.

13 Claims, 8 Drawing Sheets

APPARATUS FOR ADJUSTING OPTICAL ELEMENT

CROSS-REFERENCE TO RELATED PATENT APPLICATIONS

This application claims the priority benefit of Korean Patent Application No. 10-2010-0089462, filed on Sep. 13, 2010, in the Korean Intellectual Property Office, the disclosure of which is incorporated herein in its entirety by reference.

BACKGROUND

1. Field of the Invention

Embodiments relate to an apparatus for adjusting an optical element, and more particularly, to an apparatus for adjusting an optical element which is embodied in a compact structure and may easily adjust the position of an optical element.

2. Description of the Related Art

In an optical system having optical elements such as a lens or an optical filter, it is necessary to precisely adjust the positions of the optical elements after the optical elements are assembled. In a precise optical system, it is difficult to secure optical performance by simply assembling the optical elements.

In the assembly of an optical system, due to gravity or deviation in parts, an axial positional error may be generated on lenses, or a central axis of a lens may be inclined with respect to or deviated from an optical axis. Thus, to improve resolution of a lens, after an optical system is assembled, tilt of the lens is adjusted, the lens is centered to fit to the optical axis, or a focus is adjusted.

Typically, the lens position adjustment is complicated and the adjustment method is difficult. Also, to make the position of a lens adjustable, a mechanical equipment for adjustment typically needs to be attached to an optical system, which increases the size of the optical system and complicates the structure thereof.

SUMMARY

Embodiments include an apparatus for adjusting an optical element which may simply and easily adjust the position of an optical element.

Embodiments include an apparatus for adjusting an optical element which is embodied in a simple and compact structure and may easily adjust the position of an optical element.

Embodiments include an apparatus for adjusting an optical element which may easily adjust the position of an optical element without disassembling parts supporting the optical element.

According to an embodiment, an apparatus for adjusting an optical element includes at least one optical element for passing light, an adjustment frame coupled to an edge of the optical element, a lens barrel supporting a rear side of the adjustment frame, an elastic support unit arranged between the adjustment frame and the lens barrel and providing an elastic force to the adjustment frame, and at least one axial adjustment unit coupled to the lens barrel by penetrating the adjustment frame and the elastic support unit and adjusting a position of the adjustment frame in an axial direction.

The elastic support unit may have a circular plate shape extending along edges of the adjustment frame and the lens barrel.

The lens barrel may include a step portion inwardly protruding to support the elastic support unit and extending along a circumferential direction, the axial adjustment unit may include a screw surface on an outer circumferential surface thereof, and the adjustment frame and the step portion of the lens barrel may include screw holes to which the axial adjustment unit is screw-coupled.

The elastic support unit may include at least one axial elastic plate that protrudes toward the step portion of the lens barrel to contact the step portion and presses the elastic support unit against the adjustment frame.

The elastic support unit may include at least one axial elastic plate that protrudes toward the adjustment frame to contact the adjustment frame and presses the adjustment frame in a direction opposite to the lens barrel.

The at least one axial adjustment unit may include at least three axial adjustment units arranged at at least three positions symmetrically with respect to the center axis of the adjustment frame.

The apparatus may further include a front frame arranged in front of the adjustment frame and coupled to the lens barrel, and at least one radial adjustment unit coupled to the front frame and having an end portion penetrating the front frame to press an outer surface of the adjustment frame, thereby adjusting a position along a direction crossing an axial direction of the adjustment frame.

An inclined portion contacting the radial adjustment unit may be provided on the outer surface of the adjustment frame and, as the radial adjustment unit proceeds toward the lens barrel, the radial adjustment unit may press the inclined portion so that a position of the adjustment frame is adjusted.

The lens barrel may include a step portion inwardly protruding to support the elastic support unit and extending in a circumferential direction, the adjustment frame may include an insertion portion inserted in the step portion and an accommodation portion outwardly protruding from the insertion portion to extend circumferentially to correspond to the step portion, and the inclined portion may be installed on an outer surface of the insertion portion.

The radial adjustment unit may include a screw surface on an outer circumferential surface thereof and the front frame may include a screw hole to which the radial adjustment unit is screw-coupled.

An inclined surface contacting the inclined portion of the adjustment frame may be formed on an end portion of the radial adjustment unit.

The lens barrel may include a rim portion surrounding the adjustment frame and the elastic support unit and the elastic support unit may include at least one radial elastic plate protruding toward the rim portion and contacting the lens barrel so as to press the adjustment frame against the radial adjustment unit.

The radial elastic plate may be formed at the opposite side to the radial adjustment unit with respect to the elastic support unit.

The radial adjustment unit may include at least two radial adjustment units arranged at at least two positions.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
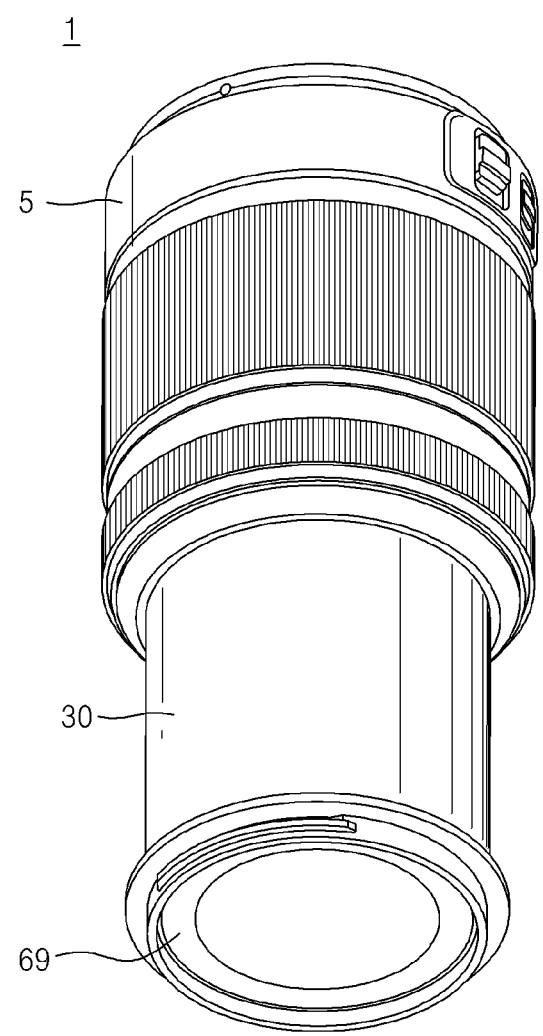
FIG. 1 is a perspective view of a lens barrel assembly having an apparatus for adjusting an optical element, according to an embodiment.

The attached drawings for illustrating exemplary embodiments are referred to in order to gain a sufficient understanding of the embodiments, the merits thereof, and the objectives accomplished by the implementation of the embodiments. Hereinafter, the exemplary embodiments will be described in detail with reference to the attached drawings. Like reference numerals in the drawings denote like elements.

Figure 2:
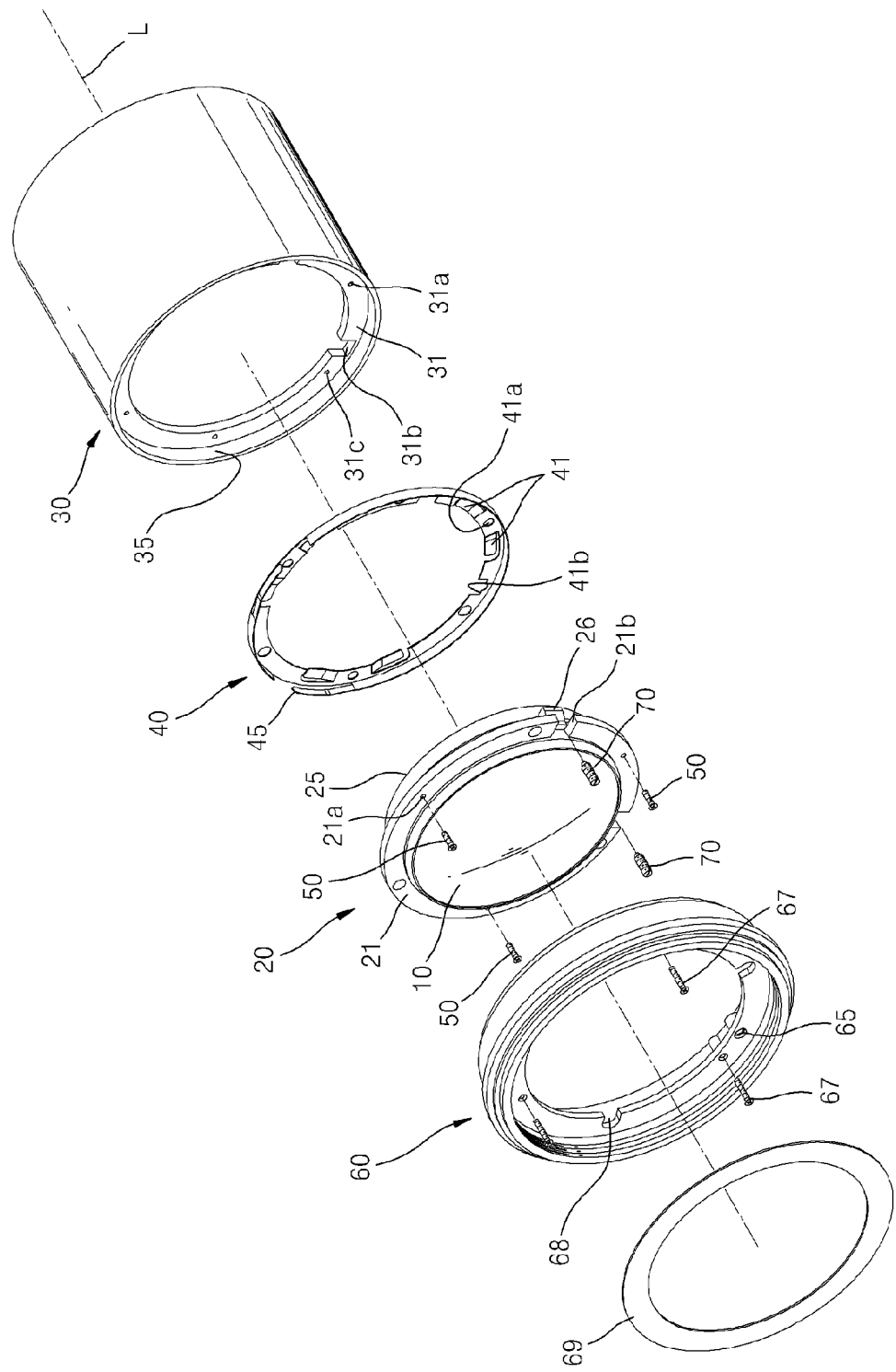
FIG. 2 is an exploded perspective view of constituent elements of the apparatus for adjusting an optical element of FIG. 1.

FIG. 1 is a perspective view of a lens barrel assembly having an apparatus for adjusting an optical element, according to an embodiment. FIG. 2 is an exploded perspective view of constituent elements of the apparatus for adjusting an optical element of FIG. 1.

Referring to FIGS. 1 and 2, the apparatus for adjusting an optical element according to the present embodiment includes a lens barrel 30 that is arranged in a housing 5 of a lens barrel assembly 1 to be capable of protruding. A decorative plate 69 is arranged at an end portion of the lens barrel 30. Before the decorative plate 69 is assembled to the lens barrel 30, the position of an optical element may be adjusted by using a position adjustment apparatus.

The apparatus for adjusting an optical element includes at least one optical element 10 that transmits light, an adjustment frame 20 coupled to an edge of the optical element 10, a lens barrel 30 supporting a rear portion of the adjustment frame 20, an elastic support unit 40 arranged between the adjustment frame 20 and the lens barrel 30 and providing an elastic force to the adjustment frame 20, and an axial adjustment unit 50.

Although the optical element 10 is a single lens in the present embodiment, this should not be construed as limiting, and a lens group in which a plurality of lenses are combined or an optical filter having a special function may be used as the optical element 10.

The adjustment frame 20 may support the optical element 10 and adjust a relative position with respect to the lens barrel 30. Accordingly, the position of the optical element 10 may be adjusted by moving the adjustment frame 20.

The lens barrel 30 supports the rear portion of the adjustment frame 20 and the elastic support unit 40. The lens barrel 30 includes a step portion 31 extending along a circumferential direction and inwardly protruding to support the elastic support unit 40.

The elastic support unit 40 has a circular plate shape extending along the edges of the adjustment frame 20 and the lens barrel 30. The elastic support unit 40 is arranged between the adjustment frame 20 and the lens barrel 30 and provides an elastic force to the adjustment frame 20.

Figure 3:
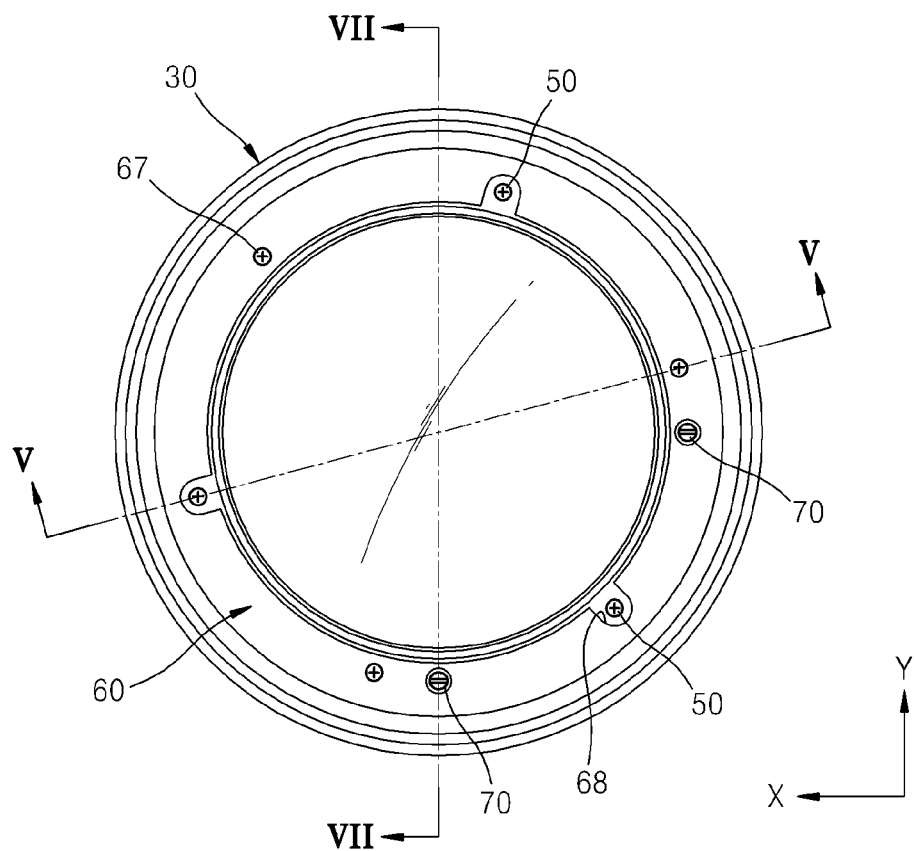
FIG. 3 is a front view of the apparatus for adjusting an optical element of FIG. 1.
Figure 4:
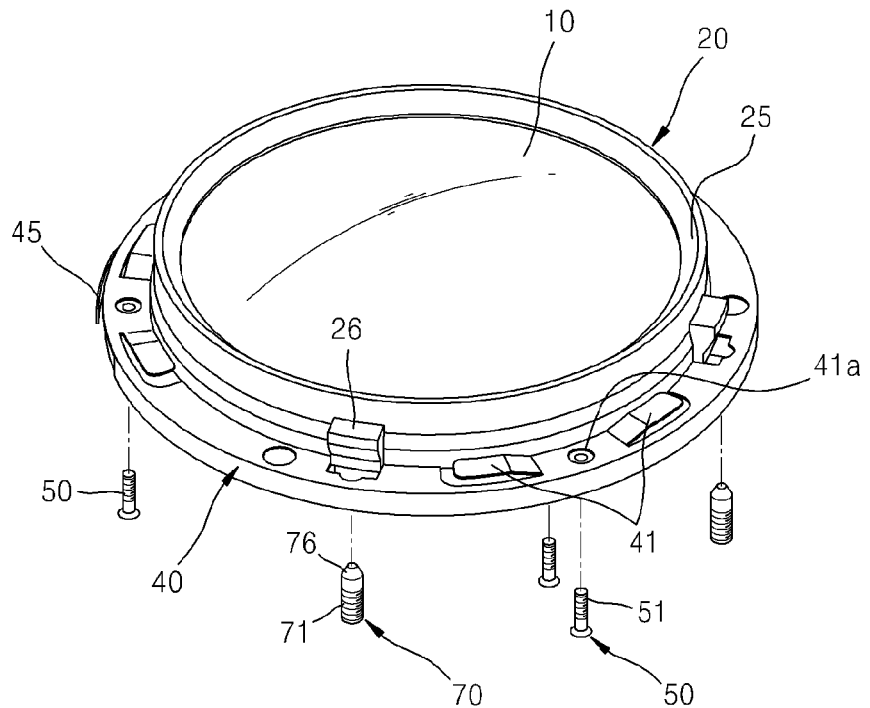
FIG. 4 is a perspective view illustrating a combination relationship of some constituent elements in the apparatus for adjusting an optical element of FIG. 2.

FIG. 3 is a front view of the apparatus for adjusting an optical element of FIG. 1. FIG. 4 is a perspective view illustrating a combination relationship of some constituent elements in the apparatus for adjusting an optical element of FIG. 2, that is, a state in which the adjustment frame 20 and the elastic support unit 40 are combined. Referring to FIG. 4, the axial adjustment unit 50 penetrates the adjustment frame 20 and the elastic support unit 40 and is coupled to the lens barrel 30, thereby adjusting the position of the adjustment frame 20 in an axial direction. The position in the axial direction signifies a direction of an optical axis L in which externally input light proceeds by passing through the optical element 10. The adjustment frame 20 may move along the direction of the optical axis L by the operation of the axial adjustment unit 50.

The axial adjustment unit 50 is arranged at at least three positions symmetrically with respect to the center axis of the adjustment frame 20. However, the number of arrangement of the axial adjustment unit 50 is not limited thereto and the axial adjustment unit 50 may be installed at four or more positions.

Figure 5:
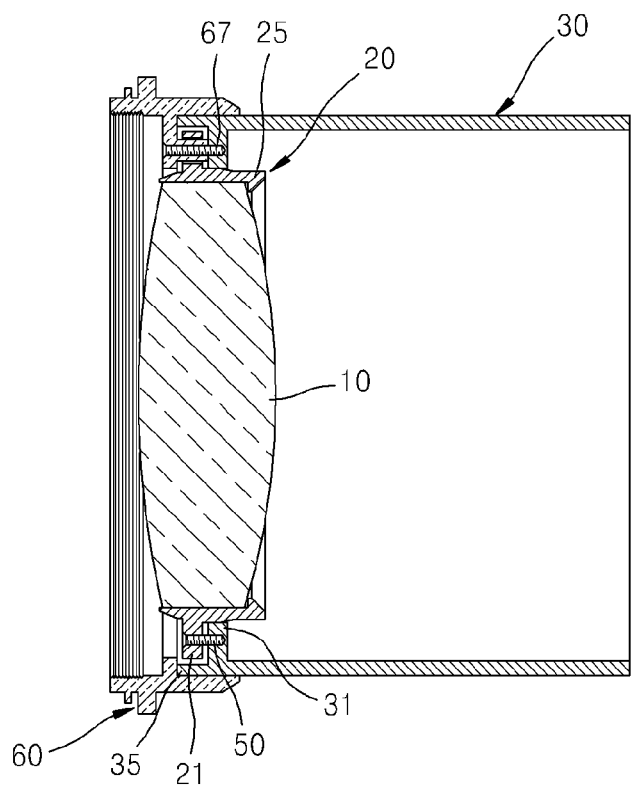
FIG. 5 is a cross-sectional view taken along a line V-V of the apparatus for adjusting an optical element of FIG. 3.
Figure 6:
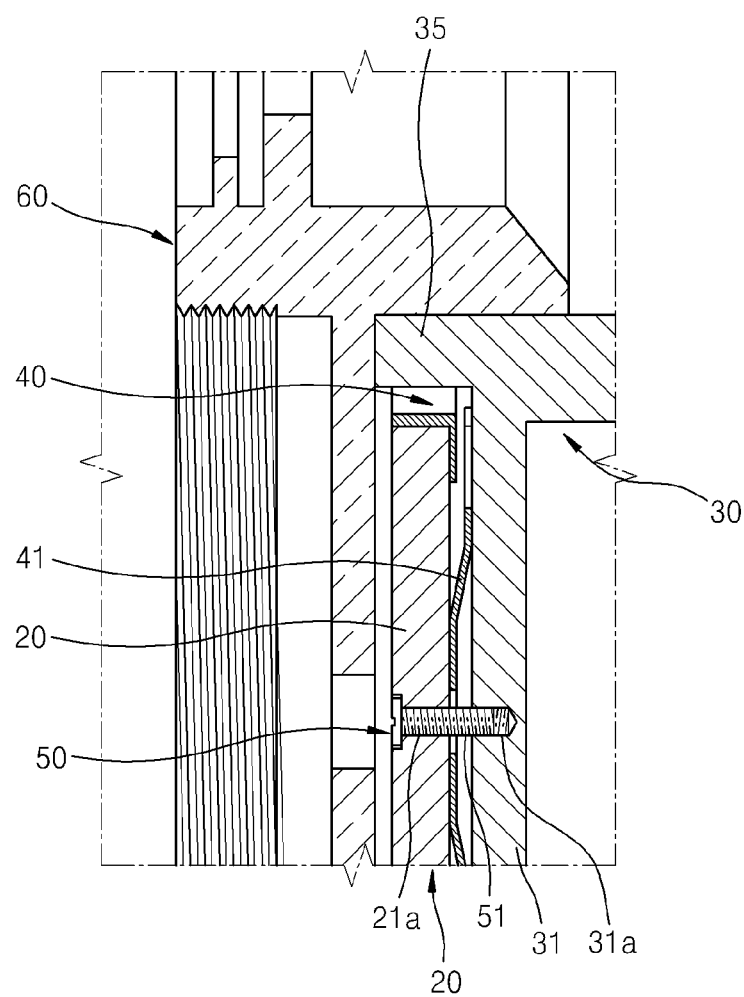
FIG. 6 is an enlarged cross-sectional view of a part of the apparatus for adjusting an optical element of FIG. 5.

FIG. 5 is a cross-sectional view taken along a line V-V of the apparatus for adjusting an optical element of FIG. 3. FIG. 6 is an enlarged cross-sectional view of a part of the apparatus for adjusting an optical element of FIG. 5.

A screw surface 51 is provided on an outer circumferential surface of the axial adjustment unit 50. The adjustment frame 20 includes a screw hole 21a to which the axial adjustment unit 50 is screw-coupled. A screw hole 31a to which the axial adjustment unit 50 is screw-coupled is provided in the step portion 31 of the lens barrel 30.

As the axial adjustment unit 50 screw-coupled to the adjustment frame 20 and the step portion 31 of the lens barrel 30 is further rotated, the axial adjustment unit 50 proceeds toward the lens barrel 30 so that the distance between the adjustment frame 20 and the lens barrel 30 decreases. When the axial adjustment unit 50 rotates in the opposite direction to be moved away from the lens barrel 30, the distance between the adjustment frame 20 and the lens barrel 30 increases.

As the adjustment frame 20 is close to or far from the step portion 31 of the lens barrel 30 by adjusting the axial adjustment unit 50, the adjustment frame 20 may be moved a predetermined distance along the optical axis L by adjusting all three axial adjustment units 50 at the same pitch. When all three axial adjustment units 50 are adjusted at the same pitch, a pint adjustment function of the optical element 10 is performed.

When only a part of the three axial adjustment units 50 is adjusted, tilt of the adjustment frame 20 with respect to the lens barrel 30 may be adjusted. In this case, a function of adjusting tilt of the optical element 10 with respect to the optical axis L is performed.

The elastic support unit 40 includes at least one axial elastic plate 41 that protrudes toward the step portion 31 of the lens barrel 30 and contacts the step portion 31 so as to press the elastic support unit 40 against the adjustment frame 20. In the present embodiment, since an axial elastic plate 41 is arranged at both sides of a through hole 41a of the elastic support unit 40 through which the three axial adjustment units 50 pass, the elastic support unit 40 elastically supports the adjustment frame 20 at three positions of the through holes 41a.

When the adjustment frame 20 is pressed against the lens barrel 30 by rotating the axial adjustment unit 50, an elastic force of the axial elastic plate 41 is applied to the adjustment frame 20. When the axial adjustment unit 50 is rotated in the opposite direction, the adjustment frame 20 is moved in a direction to be away from the step portion 31 of the lens barrel 30.

Although in the present embodiment the axial elastic plate 41 is described to protrude from a surface of the elastic support unit 40 toward the step portion 31 of the lens barrel 30, this should not be construed as limiting. For example, the axial elastic plate 41 may protrude from the elastic support unit 40 toward the adjustment frame 20 and contact the adjustment frame 20 so as to press the adjustment frame 20 in a direction opposite to or away from the step portion 31 of the lens barrel 30.

Referring to FIG. 2, the apparatus for adjusting an optical element may further include a front frame 60 arranged in front of the adjustment frame 20, and a radial adjustment unit 70 coupled to the front frame 60 and having an end portion penetrating the front frame 60 to press an outer surface of the adjustment frame 20, thereby adjusting the position along a direction crossing the axial direction of the adjustment frame 20.

The front frame 60 is coupled to the lens barrel 30 by using a bolt 67. The bolt 67 penetrates the front frame 60 and is coupled to a coupling hole 31c of the lens barrel 30. The front frame 60 includes a cut-in portion 68 that exposes the axial adjustment unit 50 to enable an access to the axial adjustment unit 50 from the outside when the decorative plate 69 is removed.

The radial adjustment unit 70 includes a screw surface 71 on an outer circumferential surface thereof. The front frame 60 includes a screw hole 65 to which the radial adjustment unit 70 is screw-coupled.

The adjustment frame 20 includes an insertion portion 25 inserted in the step portion 31 of the lens barrel 30 and an accommodation portion 21 protruding from the insertion portion 25 to extend circumferentially to correspond to the step portion 31. An inclined portion 26 contacting an end portion of the radial adjustment unit 70 is installed on the outer surface of the insertion portion 25. An inclined surface 76 that is inclined corresponding to the inclined portion 26 is formed on an end portion of the radial adjustment unit 70.

Cut portions 21b, 41b, and 31b are formed at positions where the radial adjustment unit 70 is inserted, in each of the adjustment frame 20, the elastic support unit 40, and the step portion 31 of the lens barrel 30. The end portion of the radial adjustment unit 70 may contact the inclined portion 26 via the cut portions 21b, 41b, and 31b.

Figure 7:
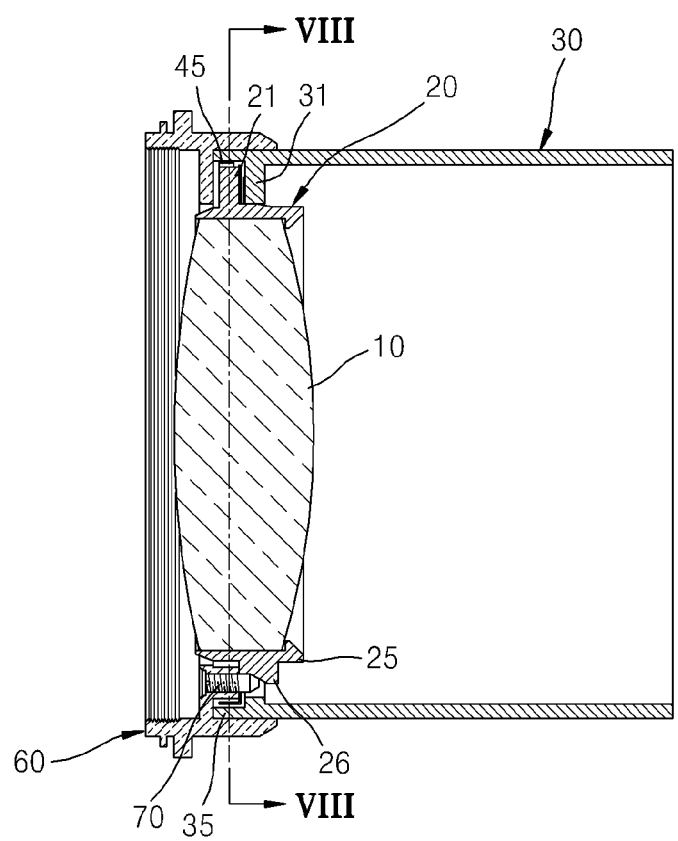
FIG. 7 is a cross-sectional view taken along a line VII-VII of the apparatus for adjusting an optical element of FIG. 3.
Figure 8:
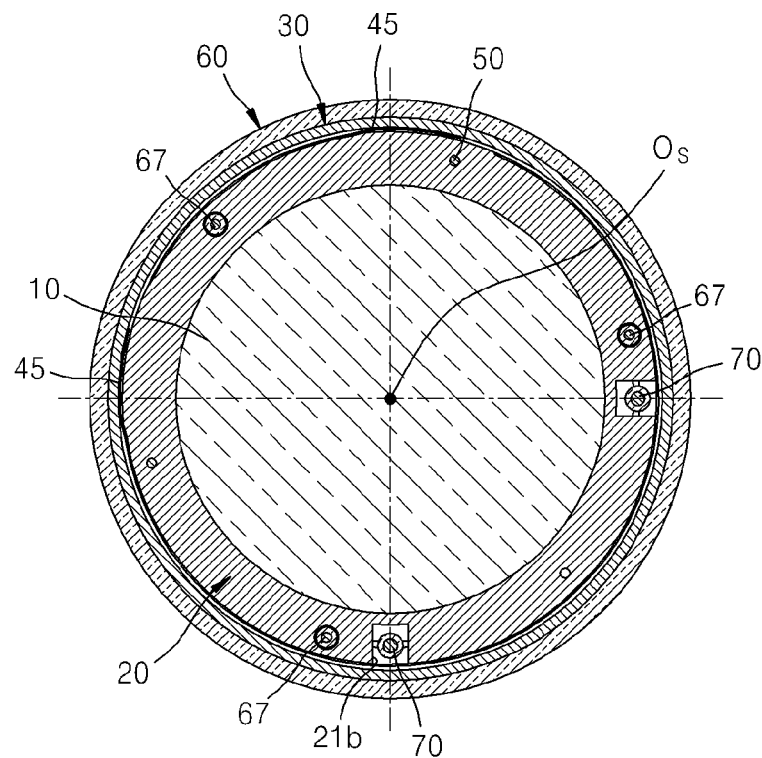
FIG. 8 is a cross-sectional view taken along a line VIII-VIII of the apparatus for adjusting an optical element of FIG. 7.
Figure 9:
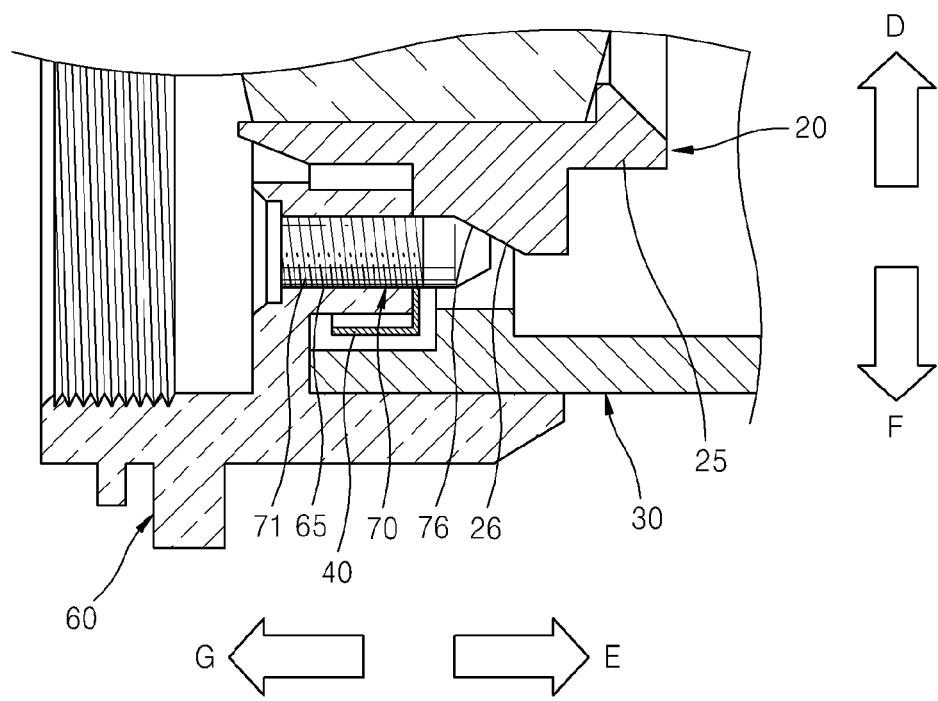
FIG. 9 is an enlarged cross-sectional view of a part of the apparatus for adjusting an optical element of FIG. 7.
Figure 10:
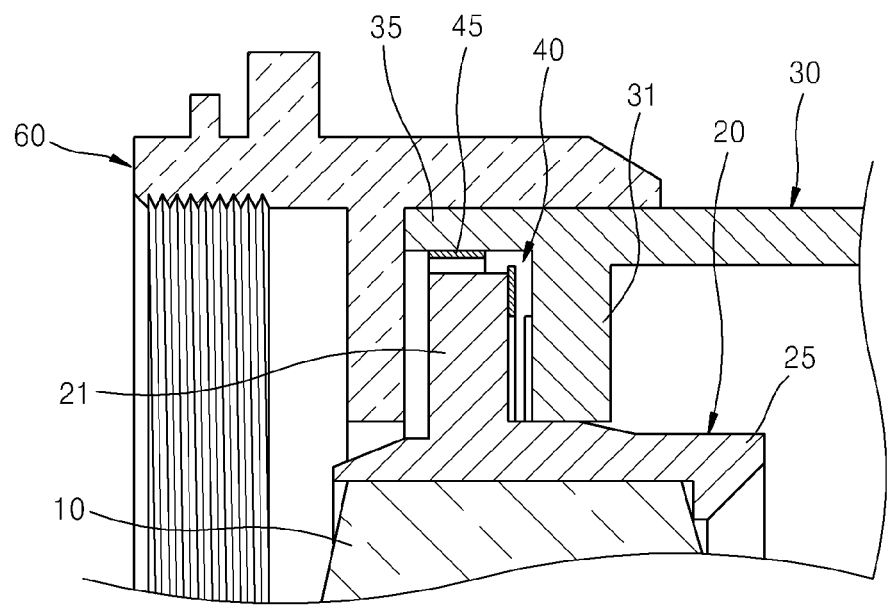
FIG. 10 is an enlarged cross-sectional view of a part of the apparatus for adjusting an optical element of FIG. 7.

FIG. 7 is a cross-sectional view taken along a line VII-VII of the apparatus for adjusting an optical element of FIG. 3. FIG. 8 is a cross-sectional view taken along a line VIII-VIII of the apparatus for adjusting an optical element of FIG. 7. FIG. 9 is an enlarged cross-sectional view of a part of the apparatus for adjusting an optical element of FIG. 7. FIG. 10 is an enlarged cross-sectional view of a part of the apparatus for adjusting an optical element of FIG. 7.

When the radial adjustment unit 70 rotates to be moved toward the lens barrel 30 in a direction indicated by an arrow E of FIG. 9, the inclined surface 76 of an end portion of the radial adjustment unit 70 presses against the inclined portion 26 of the adjustment frame 20 so that the adjustment frame 20 may be moved in a direction indicated by an arrow D of FIG. 9. Accordingly, due to the operation of the radial adjustment unit 70, the center of the optical elements 10 supported by the adjustment frame 20 may be adjusted to match the optical axis of the lens barrel 30.

The lens barrel 30 includes a rim portion 35 surrounding the adjustment frame 20 and the elastic support unit 40. The elastic support unit 40 includes a radial elastic plate 45 installed at an outer edge thereof to protrude toward the rim portion 35 of the lens barrel 30. As the radial elastic plate 45 of the elastic support unit 40 contacts the rim portion 35 of the lens barrel 30, the adjustment frame 20 presses against the radial adjustment unit 70. The radial elastic plate 45 is formed at the opposite side to the radial adjustment unit 70 with respect to the elastic support unit 40.

When the radial adjustment unit 70 rotates to be moved away from the lens barrel 30 in the opposite direction, the inclined surface 76 of the end portion of the radial adjustment unit 70 is moved in a direction indicated by an arrow G of FIG. 9 to be away from the inclined portion 26 of the adjustment frame 20. Accordingly, since the adjustment frame 20 coupled to the elastic support unit 40 is pressed in a direction indicated by an arrow F by the operation of the radial elastic plate 45 of the elastic support unit 40, the radial adjustment unit 70 is moved away from the lens barrel 30 and thus the adjustment frame 20 is moved in the direction indicated by the arrow F of FIG. 9.

Referring to FIG. 3, the radial adjustment unit 70 is arranged at two positions. That is, one radial adjustment unit 70 is arranged on a line parallel to an X-axis direction to be capable of moving the adjustment frame 20 along the X-axis direction, whereas the other radial adjustment unit 70 is arranged on a line parallel to a Y-axis direction to be capable of moving the adjustment frame 20 along the Y-axis direction. Thus, when the optical element 10 is deviated from the optical axis, the center of the optical element 10 may be easily adjusted to match the optical axis by the operation of the radial adjustment unit 70.

As described above, the apparatus for adjusting an optical element according to the present embodiment may be embodied in a compact structure by using an axial adjustment unit and an elastic support unit arranged between a lens barrel and an adjustment frame supporting an optical element.

Also, by adjusting the axial adjustment unit or the radial adjustment unit, the position of an optical element may be simply and easily adjusted without disassembling parts supporting the optical element.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An apparatus for adjusting an optical element, the apparatus comprising:
    at least one optical element for passing light;
    an adjustment frame coupled to an edge of the optical element;
    a lens barrel supporting a rear side of the adjustment frame;
    an elastic support unit arranged between the adjustment frame and the lens barrel and providing an elastic force to the adjustment frame; and
    at least one axial adjustment unit coupled to the lens barrel by penetrating the adjustment frame and the elastic support unit and adjusting a position of the adjustment frame in an axial direction,
    wherein the axial adjustment unit comprises a screw surface on an outer circumferential surface thereof, the adjustment frame comprises a screw hole to which the axial adjustment unit is screw-coupled, and the axial adjustment unit adjusts a distance between the adjustment frame and the lens barrel by rotating with respect to the adjustment frame, and
    wherein the lens barrel comprises a step portion inwardly protruding to support the elastic support unit and extending along a circumferential direction and the step portion of the lens barrel comprise a screw hole to which the axial adjustment unit is screw-coupled.

2. The apparatus of claim 1, wherein the elastic support unit has a circular plate shape extending along edges of the adjustment frame and the lens barrel.

3. The apparatus of claim 2, wherein the elastic support unit comprises at least one axial elastic plate that protrudes toward the step portion of the lens barrel to contact the step portion and presses the elastic support unit against the adjustment frame.

4. The apparatus of claim 2, wherein the elastic support unit comprises at least one axial elastic plate that protrudes toward the adjustment frame to contact the adjustment frame and presses the adjustment frame in a direction opposite to the lens barrel.

5. The apparatus of claim 2, wherein the at least one axial adjustment unit includes at least three axial adjustment units which are arranged at at least three positions symmetrically with respect to the center axis of the adjustment frame.

6. The apparatus of claim 2, further comprising:
    a front frame arranged in front of the adjustment frame and coupled to the lens barrel; and
    at least one radial adjustment unit coupled to the front frame and having an end portion penetrating the front frame to press an outer surface of the adjustment frame, thereby adjusting a position along a direction crossing an axial direction of the adjustment frame.

7. The apparatus of claim 6, wherein an inclined portion contacting the radial adjustment unit is provided on the outer surface of the adjustment frame and, as the radial adjustment unit proceeds toward the lens barrel, the radial adjustment unit presses the inclined portion so that a position of the adjustment frame is adjusted.

8. The apparatus of claim 7, wherein the lens barrel comprises a step portion inwardly protruding to support the elastic support unit and extending in a circumferential direction, the adjustment frame comprises an insertion portion inserted in the step portion and an accommodation portion outwardly protruding from the insertion portion to extend circumferentially to correspond to the step portion, and the inclined portion is installed on an outer surface of the insertion portion.

9. The apparatus of claim 7, wherein the radial adjustment unit comprises a screw surface on an outer circumferential surface thereof and the front frame comprises a screw hole to which the radial adjustment unit is screw-coupled.

10. The apparatus of claim 9, wherein an inclined surface contacting the inclined portion of the adjustment frame is formed on an end portion of the radial adjustment unit.

11. The apparatus of claim 6, wherein the lens barrel comprises a rim portion surrounding the adjustment frame and the elastic support unit and the elastic support unit comprises at least one radial elastic plate protruding toward the rim portion and contacting the lens barrel so as to press the adjustment frame against the radial adjustment unit.

12. The apparatus of claim 11, wherein the radial elastic plate is formed at the opposite side to the radial adjustment unit with respect to the elastic support unit.

13. The apparatus of claim 6, wherein the radial adjustment unit comprises at least two radial adjustment units arranged at at least two positions.

* * * * *